April 15, 1969 J. W. DAVIES ET AL 3,438,265

TWO-AXIS ACCELEROMETER

Filed March 29, 1965

INVENTORS:
JAMES W. DAVIES
WALTER M. CAROW

BY

ATTORNEY

United States Patent Office 3,438,265
Patented Apr. 15, 1969

3,438,265
TWO-AXIS ACCELEROMETER
James W. Davies, Wayne, and Walter M. Carow, West Caldwell, N.J., assignors to Singer-General Precision, Inc., a corporation of Delaware
Filed Mar. 29, 1965, Ser. No. 443,478
Int. Cl. G01p 15/00
U.S. Cl. 73—516                                    4 Claims

ABSTRACT OF THE DISCLOSURE

A pendulum-type, two-axes accelerometer with an outer housing and an inner body disposed in a cavity formed within the housing and having a bell-shaped proof mass disposed in the cavity of the housing, and interposed between the inner surface of the housing and the outer face of the inner body and having its upper portion attached with a flex member to the housing so that the proof mass may be free to move within the housing between the inner body and the housing and further having a pickoff means for sensing the acceleration forces acted upon said proof mass. The pickoff is a capacitive-type including a pair of diametrically opposite plates which are coaxial with the proof mass and the housing axes and a torquer means disposed between the radial outer face of the inner body and the radial inner surface of the proof mass, respectively. The accelerometer includes a pair of diametrically opposite torquer units which are also in a coaxial relation with said housing, said proof mass, and said inner body. The torquer units having respective magnets, are supported and co-operative to coils mounted on the proof mass which torquer restores the proof mass to its null position which is coaxial with the inner body and said housing. In addition, the torquer has a vernier-type torque adjusting flux-shunting metal sleeve which co-operates with the torquer units for trimming the torquer scale factor.

The present invention relates to two-axis accelerometers, and particularly to a pendulum-type two-axis accelerometer.

In a conventional pendulum-type two-axis accelerometer, the proof mass is an elongate tube closed by a housing having one tube end pivotally connected to said housing and having an opposite tube end with spaced portions carrying a torquer means and a pickoff means which are disposed between the tube and the housing.

With this conventional structure, slight deflections of the torquer means relative to the pickoff means transverse to the tube due to slight deformations of the tube can cause pickoff errors. Some high performance installations cannot tolerate even such a slight pickoff error.

In accordance with one embodiment of the present invention, slight deflections of the torquer relative to the pickoff transverse to the tube due to tube deformations are substantially minimized by arranging the torquer and the pickoff in a common plane substantially transverse to the tube and disposed on opposite sides of the tube wall.

Accordingly, it is one object of the present invention to provide a pendulum-type two-axis accelerometer in which pick-off errors are substantially minimized.

It is another object of the invention to provide a pendulum-type two-axis accelerometer in which shear forces on the pivot connection of the proof mass are substantially minimized.

It is a further object of the invention to provide a two-axis accelerometer in which electrical interferences between the pickoff means and the torquer means are substantially minimized.

To the fulfillment of these and other objects, the invention provides a two-axis accelerometer comprising a housing, pickoff means and a proof mass. The housing has a peripheral wall with an elongate axis and has a pair of axially-spaced end walls forming a cavity. The pickoff is disposed within the cavity and is mounted on one of the end walls coaxially therewith. The proof mass is suspended within the cavity and has a tubular portion at one end thereof surrounding the pickoff means and displaceable transverse to said axis and said pickoff means.

Other objects of the invention will become apparent upon reading the annexed detailed description in connection with the drawings, wherein like parts are designated by like numerals throughout the several views and wherein.

Figure 1:
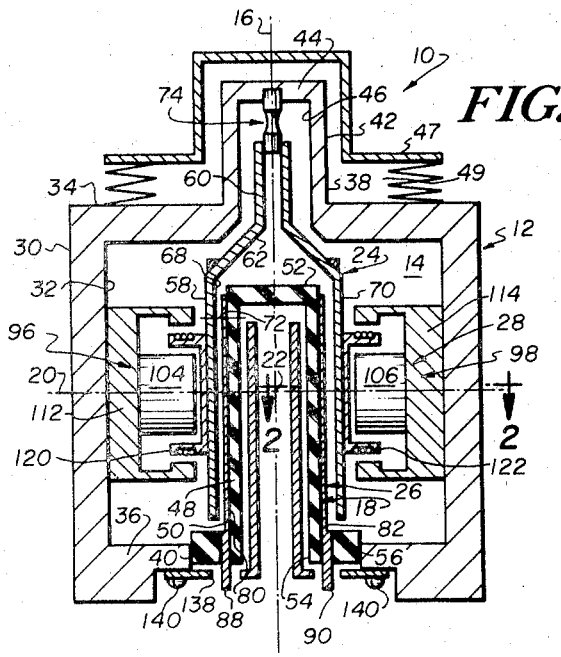
FIG. 1 is a sectional view of a two-axis pendulum-type accelerometer embodying features of the present invention.
Figure 2:
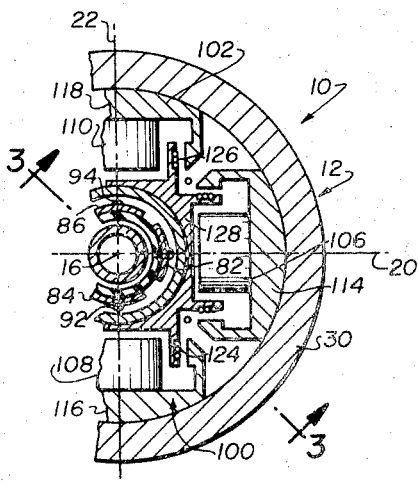
FIG. 2 is a sectional view taken along line 2—2 of FIG. 1.

Referring to FIG. 1, one embodiment of the present invention comprises an accelerometer 10 having an outer housing or casing 12, which has an elongate cavity 14 with a Z-axis 16; an inner body 18, which is disposed within cavity 14 coaxially therewith and which is fixedly connected to one end of housing 12, and which together with housing 12 has an X-axis 20 and a Y-axis 22 that are arranged substantially at right angles to each other and are disposed in a plane intersecting Z-axis 16 substantially at right angles thereto. Accelerometer 10 also comprises a proof mass 24, which is pivotally connected at one end thereof to housing 12 and which is disposed within cavity 14. Proof mass 24 surrounds inner body 18 and overlaps one end thereof, and is displaceable transversely to Z-axis 16 relative to housing 12 and inner body 18 for sensing acceleration force components parallel to X-axis 20 and Y-axis 22. Accelerometer 10 also comprises a pickoff means 26, which is disposed between proof mass 24 and inner body 18, and a torquer means 28, which is disposed between proof mass 24 and housing 12.

Housing 12 has a peripheral wall 30 with a substantially cylindrical radially inner face 32, which is substantially concentric about Z-axis 16; and housing 12 has a pair of end walls 34, 36, which are axially spaced along Z-axis 16 thereby forming cavity 14 therebetween. Cavity 14 preferably contains damping fluid (not shown.)

End wall 34 has a center portion 38 to which proof mass 24 is connected; and end wall 36 has a bore portion 40 to which inner body 18 is connected. Center portion 38, which projects in an axially outward direction from the remainder of wall 34, has a cylindrical peripheral wall 42, which is concentric about Z-axis 16, and has an end wall 44, which forms a deep cylindrical recess 46 that is disposed on the axially inner side of wall 34 facing cavity 14.

Figure 3:
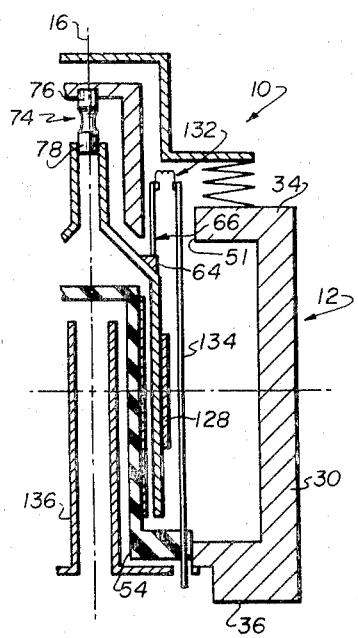
FIG. 3 is a sectional view taken along line 3—3 of FIG. 2.

End wall 34 is substantially covered on the axially outer side thereof by a bellows means 47. Bellows 47 forms an antechamber 49, which contains damping fluid (not shown). Chamber 49 communicates with cavity 14 through openings 51 (FIG. 3) in wall 34.

Inner body 18, which is preferably composed of electrically-insulating material, such as glass or the like, also has a peripheral wall 48 with a substantially cylindrical radially outer face 50, which is concentric about Z-axis 16. Inner body 18 also has an end wall 52, which is adjacent to wall 34 and which closes one end of inner body 18. Walls 48, 52 enclose a cup-shaped recess 54 that is closed at one end by wall 52 and is opened at its other end.

Inner body 18 has a cylindrical flange portion 56, which is adjacent to the open end of inner body 18, and which extends in a radially outward direction from face 50. Flange 56 is journaled in bore 40 and wall 36 so that inner body 18 is fixedly joined to housing 12 and so that recess 54 faces axially outwardly from the exterior of housing 12.

Proof mass 24, which is preferably a pendulous, tapered, metal tube, that is immersed in damping fluid within cavity 14, has a bell-shaped tube wall portion 58 of enlarged diameter at one end, an integral stem-shaped tube wall portion 60 of narrower diameter at the other end, and a tapered tube wall portion 62, which is disposed between and interconnects wall portions 58 and 60. With such construction, the buoyant center of gravity of proof mass 24 substantially coincides with the intersection of X-axis 20, Y-axis 22 and Z-axis 16.

Tapered portion 62 supports an annular terminal collar 64, which is disposed on the radially outer side thereof. Collar 64 has terminals 66 (FIG. 3) for supplying power to torquer 28, as more fully explained hereafter.

Bell portion 58 has a cylindrical radially inner surface 68, which faces outer face 50; and bell portion 58 also has a cylindrical radially outer surface 70, which faces inner face 32. Surface 68 and face 50 are separated by an annular gap 72 of substantially uniform thickness and are also substantially concentric about Z-axis 16 when accelerometer 10 is at a null condition in the absence of acceleration forces. However, when acceleration forces act on accelerometer 10, proof mass 24 displaces slightly relative to inner body 18 thereby varying thickness of gap 72.

Stem 60 is received in recess 46 with clearance therefrom. Stem 60 has a coaxial metal flexure member 74 connected to one end thereof. Flex member 74, which is a universal-joint type pivot, has one end portion 76, which is fixdly connected to wall 44, and has an opposite end portion 78, which is similarly connected to stem 60. Ends 76, 78 are electrically-conductive for grounding proof mass 24 through housing 12.

Any acceleration force acting on accelerometer 10, which has components acting parallel to X-axis 20 and Y-axis 22, causes diametrically opposite portions of gap 72 along said axes 20 and 22 to vary oppositely in size and thickness. In this way, pickoff 26 can sense the direction and amount of any such acceleration force.

Pickoff 26, which is preferably a capacitive-type pickoff and which is disposed in gap 72, preferably includes a pair of diametrically opposite plates 80, 82, which are coaxial along the X-axis 20 and includes a second pair of diametrically opposite plates 84, 86, which are coaxial along the Y-axis 22. Plates 80, 82, 84, 86 have a substantially smaller thickness than the minimum thickness of gap 72, are preferably supported by and attached to outer face 50 for cooperation with inner surface 68 that is separated therefrom, are preferably equal-area and equi-spaced thin films in construction that are deposited on outer face 50, and have respective equi-spaced terminals 88, 90, 92, 94 that are sealingly mounted in header flange 56 and which extend through housing 12 for forming a terminal assembly on the exterior of housing 12.

Torquer means 28, which is disposed between outer surface 70 and inner face 32, includes a pair of diametrically opposite torquer units 96, 98, which are coaxial along X-axis 20, and also includes a pair of diametrically opposite torquer units 100, 102, which are coaxial along Y-axis 22.

Torquer units 96, 98, 100, 102 have respective magnets 104, 106, 108, 110, which are fixedly supported by return-path magnet holders 112, 114, 116, 118 that are mounted on inner face 32; and also have respective cooperating coils 120, 122, 124, 126, which are supported by a coil holder 128, that is mounted on outer surface 70.

Terminals 66 (FIG. 3) supply coils 120, 122, 124, 126 and are connected by flex leads 132 to exterior terminals 134 mounted in flange 56.

With such construction, torquer 28 restores proof mass 24 to its null point coaxial with inner body 18 after displacement therefrom by an acceleration force. Torquer 28 is preferably biased to nullify any unbalancing effects of gravity force and similar tilting forces.

Torquer 28 also has a vernier-type, torque-adjusting, flux-shunting metal sleeve 136 (FIG. 3), which is received in recess 54 and which cooperates with torquer units 96, 98, 100, 102 for trimming the torquer scale factor. Sleeve 136 has a mounting flange 138, which is adjustably connected to wall 36 by a connector or bolt 140. Sleeve 136 is preferably composed of a magnetic-compensating-type of metal, whereby sleeve 136 provides lower shunting and higher torquing at higher temperatures in order to counteract the normally lower torquing by magnets 104, 106, 108, 110 at higher temperatures. In this way, sleeve 136 helps to provide a substantially constant torquer scale factor. Sleeve 136 normally shunts a portion of the magnetic flux from magnets 104, 106, 108, 110 through wall 36 to wall 30 thereby by-passing return-path holders 112, 114, 116, 118. With this construction, torquer 28 can be calibrated and adjusted from the exterior of housing 12 after final sealing and final assembly.

In summary, this invention provides a pendulum-type two-axis accelerometer in which pickoff errors are substatnially minimized, in which shear forces on its pivot connection are substantially minimized, and in which electrical interferences between pickoff means and torquer means are substantially minimized.

While the present invention has been described in a preferred embodiment, it will be obvious to those skilled in the art that various modifications can be made therein within the scope of the invention. For example, accelerometer 10 can be used as a platform vertical sensing means. It is intended that the appended claims cover all such modifications.

What is claimed is:

1. A two-axis accelerometer for sensing acceleration along the two second and third axes of three axes which are in quadrature, comprising:

a housing with an elongate axis corresponding to the first of said three axes having a peripheral wall and a pair of axially-spaced end walls forming a cavity containing a damping fluid;

an inner body disposed in said cavity coaxially therewith and mounted on one end wall thereof with a radially outer face facing said peripheral wall;

a bell-shaped proof mass disposed in said damping fluid within said cavity for motion transverse to said housing axis having a universal-type flex connection to the other end wall thereof and having a radially inner surface facing said radially outer face and having a radially outer surface facing said peripheral wall;

capacitive pickoff means disposed between said radially inner surface and said radially outer face said pickoff means being disposed coaxially with regard to said second and third axes so that acceleration having components along said second and third axes causes opposite portions of gap along said axes to vary in size and thickness the pickoff means then sensing the direction and amount of any such acceleration force; and torquer means disposed between said radially outer surface and the adjacent portion of said peripheral wall.

2. An accelerometer as claimed in claim 1, in which said inner body has a plurality of peripherally-spaced, axially-parallel pairs of diametrically-opposite elongate metal strips bonded to said radially outer face, and said proof mass includes a grounded metal conductor whereby a plurality of pairs of two-plate capacitive pickoff units are provided.

3. An accelerometer as claimed in claim 1, in which said inner body and its adjacent housing end wall have a coaxial recess opening in an axially outward direction therefrom and have a trimming member received in said recess and adjustable therefrom for trimming the scale factor and bias of said torquer from the exterior of said accelerometer.

4. An accelerometer as claimed in claim 1, in which said cavity contains damping fluid and in which one of said end walls has at least one opening therethrough with a bellows means covering said opening thereby providing a variable-volume cavity adjustable to temperature-induced changes in the damping fluid pressure.

References Cited

UNITED STATES PATENTS

| | | | |
|---|---|---|---|
| 2,665,896 | 1/1954 | Kirby et al. | 73—516 X |
| 2,964,949 | 12/1960 | Wilcox | 73—305 X |
| 3,084,558 | 4/1963 | Wilcox et al. | 73—517 |
| 3,101,003 | 8/1963 | Lees | 73—517 |
| 3,132,521 | 5/1964 | Krupick et al. | 73—517 |

FOREIGN PATENTS

| | | |
|---|---|---|
| 791,827 | 3/1958 | Great Britain. |
| 599,933 | 6/1960 | Great Britain. |

JAMES J. GILL, *Primary Examiner.*